(12) United States Patent
Guerin

(10) Patent No.: US 9,589,340 B2
(45) Date of Patent: Mar. 7, 2017

(54) METHOD AND DEVICE FOR PREPARING A SPECTACLE FRAME

(71) Applicant: TIPHERET, Annecy (FR)

(72) Inventor: Claude Guerin, Annecy (FR)

(73) Assignee: TIPHERET, Annecy (FR)

( * ) Notice: Subject to any disclaimer, the term of this patent is extended or adjusted under 35 U.S.C. 154(b) by 42 days.

(21) Appl. No.: 14/426,240

(22) PCT Filed: Sep. 6, 2013

(86) PCT No.: PCT/IB2013/058351
§ 371 (c)(1),
(2) Date: Mar. 5, 2015

(87) PCT Pub. No.: WO2014/037915
PCT Pub. Date: Mar. 13, 2014

(65) Prior Publication Data
US 2015/0243015 A1    Aug. 27, 2015

(30) Foreign Application Priority Data

Sep. 7, 2012 (FR) ...................... 12 58378

(51) Int. Cl.
*G06K 9/00* (2006.01)
*G06T 7/00* (2006.01)
(Continued)

(52) U.S. Cl.
CPC .......... *G06T 7/0004* (2013.01); *G02C 13/003* (2013.01); *G06K 9/0061* (2013.01);
(Continued)

(58) Field of Classification Search
CPC ..... G02C 13/003; G02C 7/027; G02C 13/001
(Continued)

(56) References Cited

U.S. PATENT DOCUMENTS 5,576,778 A    11/1996 Fujie
5,592,248 A *  1/1997 Norton ................. G02C 13/003
                                                        33/200
(Continued)

FOREIGN PATENT DOCUMENTS

AU        636806 B1    5/1993
EP      1011006 A1    6/2000
(Continued)

*Primary Examiner* — Yosef Kassa
(74) *Attorney, Agent, or Firm* — William H. Eilberg

(57) ABSTRACT

A method for preparing a spectacle frame (1) adapted to a face, the spectacle frame (1) having a bridge (11) between two optical lenses (9-10) and a surface (2) having end pieces (5-6) to which temples (3-4) are connected. The method includes providing an image of the face; identifying the characteristic points on the image of the face; identifying shape points on the image of the face; identifying the shape of the face from among predefined characteristic shapes using the shape points; determining from the characteristic points a frame of reference for receiving the surface of the spectacle frame; and determining the height position and width of the end pieces relative to the surface of the spectacle frame depending on the face shape identified.

6 Claims, 9 Drawing Sheets

(51) Int. Cl.
  *G02C 13/00* (2006.01)
  *G06K 9/52* (2006.01)
(52) U.S. Cl.
  CPC ..... *G06K 9/00248* (2013.01); *G06K 9/00268* (2013.01); *G06K 9/00281* (2013.01); *G06K 9/52* (2013.01)
(58) Field of Classification Search
  USPC ....... 382/140, 141, 209, 286, 291, 128, 151, 382/199, 203, 206, 307; 348/77, 78, 86
  See application file for complete search history.

(56) References Cited

U.S. PATENT DOCUMENTS

| | | | | |
|---|---|---|---|---|
| 6,533,418 B1* | 3/2003 | Izumitani | ............ | G02C 13/003 351/204 |
| 6,692,127 B2* | 2/2004 | Abitbol | ............ | G06Q 30/0641 345/419 |
| 6,922,494 B1* | 7/2005 | Fay | ............ | G01S 15/08 348/163 |
| 7,016,824 B2* | 3/2006 | Waupotitsch | ............ | G06T 19/00 345/419 |
| 7,222,091 B2* | 5/2007 | Yoshida | ............ | A61B 3/032 351/246 |
| 7,845,797 B2* | 12/2010 | Warden | ............ | G02C 13/003 351/204 |
| 7,950,800 B2* | 5/2011 | Nauche | ............ | G02C 13/005 351/204 |
| 8,118,427 B2* | 2/2012 | Bonnin | ............ | G02B 27/0172 351/159.75 |
| 8,231,220 B2* | 7/2012 | Baranton | ............ | G02C 13/003 351/200 |

FOREIGN PATENT DOCUMENTS

| | | |
|---|---|---|
| FR | 2713787 A1 | 6/1995 |
| WO | 0016683 A1 | 3/2000 |

* cited by examiner

METHOD AND DEVICE FOR PREPARING A SPECTACLE FRAME

TECHNICAL FIELD OF THE INVENTION

The present invention concerns frames for vision-correcting spectacles or sunglasses, and more particularly a method of preparing a spectacle frame adapted to the shape of a face, the lenses of which are correctly positioned relative to the eyes for correct vision, and the spectacle frame of which is correctly positioned relative to the face.

There exist on the market a large number of spectacle frames. Spectacle frames usually comprise a frame front with end-pieces to which temples are connected. The frame front is adapted to receive two lenses, the temples are adapted to engage over the ears of a user, and a bridge is provided in the frame front to connect the lenses.

Spectacle frames usually have different shapes and colors. They vary with fashion. The user must chose the spectacle frame they want from a large choice of available spectacle frames.

However, making a choice from all these spectacle frames quickly proves complicated and time-consuming, so great is the number of spectacle frames. The choice is moreover dependent on the quality of the optician's advice. Users are therefore not reassured as to the quality of their choice, notably with respect to their face and their lifestyle.

The document FR 2 713 787 A1 and its American equivalent U.S. Pat. No. 5,576,778 A teach producing an image of the face of a person, identifying particular points on the profile of the face, and deducing therefrom control points of a Bezier curve that defines the perimeter of the spectacle lenses. This document does not define the position and the width of the end-pieces as a function of a face shape, does not teach how to identify the shape of the face, and does not define the spectacle frame front itself.

The document WO 00/16683 A1 describes a method of choosing a spectacle frame based on capturing an image of the face and superimposing, on that image, a spectacle frame image taken from a library of spectacle frames. This document does not determine the height and the width of the end-pieces as a function of the face shape.

The document AU 636 806 B1 describes a tool for identifying the general shape of a human face in order thereafter to assist in choosing a pair of spectacles. The document gives a few hints for choosing the pair of spectacles as a function of the shape of the face. However, the shape of the spectacle frame is not positively determined and in particular the width of the end-pieces is not defined.

The document EP 1 011 006 A1 teaches that changing the position of the end-pieces in terms of height can modify the appearance of a face if it is long or if it is short. However, the document gives no positive definition of how to choose the height of the end-pieces, as this choice is left to the user by offering them, on a computer screen, the combination of an image of their face and an image of the spectacle frame.

At present there exists no method of preparing a spectacle frame that takes into account in a satisfactory manner the lack of symmetry of a face in order to correct for this.

SUMMARY OF THE INVENTION

A first problem addressed by the present invention is providing a method of preparing a spectacle frame that is independent of the competence of the optician, that can be automated, that ensures an optimum adaptation of the spectacle frame to the necessarily non-symmetrical shape of the face of a user, that enables a significant saving in time when choosing a spectacle frame, and that facilitates obtaining an optimum spectacle frame as a function of each face.

The invention aims in particular on the one hand to position the spectacle lenses correctly relative to the eyes of the user despite the lack of horizontal and vertical symmetry of their face and on the other hand to position and to size the spectacle frame correctly relative to the face of the user so as to compensate the lack of symmetry of the face and impart to it a regular and symmetrical appearance.

To achieve the above and other objects, the invention proposes a method for preparing a spectacle frame adapted to a face, the spectacle frame having a bridge between two lenses and a frame front with end-pieces to which temples are connected, including the following steps:

procuring an image of the face, forehead uncovered,
identifying characteristic points on the image of the face,
identifying shape points on the image of the face,
identifying by these shape points the shape of the face among predefined characteristic shapes,
determining from these characteristic points a receiving box for the frame front of the spectacle frame, and
determining the width and the position in terms of height of the end-pieces relative to the frame front of the spectacle frame as a function of the identified shape of the face.

Such a method comprises only a few steps. The shape points and the characteristic points are very easily identifiable on the image of a face by an optician independently of any particular know-how of the optician or their knowledge of anatomy.

Noting the shape points and characteristic points on the image of the face of a user is a technical step that is also independent of the aesthetic tastes of the optician.

Each face is assigned a specific receiving box for the spectacle frame.

The receiving box is qualified precisely and always independently of the competence of the optician and their aesthetic tastes.

To each face shape there corresponds a specific width and a specific position in terms of height of the end-piece. The choice of the height of the end-piece is always independent of the competence and aesthetic tastes of the optician.

This method is therefore completely independent of the competence of the optician and is fast and effective.

The method may advantageously be implemented by a device for automatic execution.

Automating this method enables a time saving and makes it possible to ensure objectivity in respect of the shape of the spectacle frame.

The characteristic points may advantageously comprise:
the point A that is situated at the front hairline,
the point A1 that is situated at the center of the root of the nose,
the point A2 that is situated at the point of the chin,
the point OD that is the center of the right pupil,
the point OG that is the center of the left pupil.

Each of these points is easily identifiable on the image of a face, without this necessitating an in-depth knowledge of human anatomy.

These characteristic points need not be positioned with millimeter precision, a precision of the order of half a centimeter being sufficient.

The method may advantageously further include the step of identifying the median vertical line V that is the straight line nearest the points A, A1 and A2.

The median vertical line V may advantageously be determined by the least squares method.

Identifying the point A1 makes it possible to adjust a vertical axis of the face along the median vertical line V to compensate any lack of symmetry or deformation of the nose.

The least squares method is an effective method for obtaining a straight line passing as close as possible to three points. It is easily implemented by an automatic device.

The method may advantageously further include the following steps:

identifying a right pupil axis APD that is parallel to the median vertical line V and that passes through the point OD, identifying a left pupil axis APG that is parallel to the median vertical line V and that passes through the point OG, identifying a right geometric axis AGD that is parallel to the median vertical line V and that is offset toward the right ear at a distance of half an interpupillary distance OD-OG increased by a distance d, said distance d being approximately 3.5 mm for an image on a 1:1 scale, identifying a left geometric axis AGG that is parallel to the median vertical line V and that is offset toward the left ear at a distance of half an interpupillary distance OD-OG increased by a distance d, said distance d being approximately 3.5 mm for an image on a 1:1 scale, identifying the point PD that is the intersection between the right pupil axis APD and the top of the right cheek, identifying the point PG that is the intersection between the left pupil axis APG and the top of the left cheek, identifying the point SD at the intersection between the lower boundary of the right eyebrow and the right pupil axis APD, identifying the point SG at the intersection between the lower boundary of the left eyebrow and the left pupil axis APG, identifying the line LS of the eyebrows, which is perpendicular to the median vertical line V and that passes at median distance of the points SD and SG, identifying the line LP of the cheeks, which is perpendicular to the median vertical line V and that passes at median distance of the points PD and PG, identifying the horizontal geometrical axis AGH of the frame, which is situated equidistantly from the eyebrow line LS and the cheek line LP, and which cuts the right geometrical axis AGD at the point QD and the left geometrical axis AGG at the point QG, identifying the point N'D that is the intersection between the horizontal geometrical axis AGH and the base of the right wing of the nose, identifying the point N'G that is the intersection between the horizontal geometrical axis AGH and the base of the left wing of the nose, identifying the point NO that is the intersection between the median vertical line V and the horizontal geometrical axis AGH, identifying the point ND that is on the horizontal geometrical axis AGH and that is half the distance N'D-N'G toward the right ear from the point NO, identifying the point NG that is on the horizontal geometrical axis AGH and that is half the distance N'D-N'G toward the left ear from the point NO, identifying the line PND parallel to the median vertical line V passing through the point ND, identifying the line PNG parallel to the median vertical line V passing through the point NG, identifying the point MTD that is the intersection between the horizontal geometrical axis AGH and the line SPND symmetrical to the axis PND relative to the right geometric axis AGD, identifying the point MTG that is the intersection between the horizontal geometrical axis AGH and the line SPNG symmetrical to the axis PNG relative to the left geometric axis AGG, identifying the point STD that is the intersection between the axis SPND and the eyebrow line LS, identifying the point SND that is the intersection between the axis PND and the eyebrow line LS, identifying the point STG that is the intersection between the axis SPNG and the eyebrow line LS, identifying the point SNG that is the intersection between the axis PNG and the eyebrow line LS, identifying the point ITD that is the intersection between the axis SPND and the cheek line LP, identifying the point IND that is the intersection between the axis PND and the cheek line LP, identifying the point ITG that is the intersection between the axis SPNG and the cheek line LP, identifying the point ING that is the intersection between the axis PNG and the cheek line LP, identifying the upper root ROD of the right ear, identifying the upper root ROG of the left ear, identifying the right end-piece line TD parallel to the median vertical line V and offset toward the right ear by a distance D, said distance D being half the distance ROD-ROG, identifying the point S'R'D' that is the intersection between the right end-piece line TD and the eyebrow line LS, identifying the point I'R'D' that is the intersection between the right end-piece line TD and the cheek line LP, identifying the left end-piece line TG parallel to the median vertical line V and offset toward the left ear by a distance D, said distance D being half the distance ROD-ROG, identifying the point S'R'G' that is the intersection between the left end-piece line TG and the eyebrow line LS, identifying the point I'R'G' that is the intersection between the left end-piece line TG and the cheek line LP.

Each of these points is easily identifiable on the image of a face, without necessitating an in-depth knowledge of human anatomy.

Taking into account half the interpupillary distance OD-OG, half the distance N'D-N'G and half the distance ROD-ROG makes it possible to attenuate effectively the effect of any lack of horizontal symmetry of the face.

Similarly, using a mean eyebrow line LS, a mean cheek line LP, and horizontal axes perpendicular to a median vertical line makes it possible to attenuate effectively the effect of any lack of vertical symmetry of the face.

The receiving box may advantageously include:

a right lens box, determined by the points STD SND IND ITD, a left lens box, determined by the points STG SNG ING ITG, a nose box, determined by the points SND SNG ING IND, a rectangular box for the left end-piece, determined by the points STG, S'R'G', I'R'G', ITG, a rectangular box for the right end-piece, determined by the points STD, S'R'D', I'R'D', ITD.

The receiving box is therefore constructed from independent characteristic points easily identifiable on the image of a face independently of the knowledge of human anatomy that the optician might have.

The method may advantageously include the following steps for determining the shape of the face:
- identifying on the image of the face the line LB of the mouth, which is the line perpendicular to the median vertical line V and that passes as closely as possible the two end points at the corners of the lips,
- identifying on the image of the face the line HA that is the horizontal line perpendicular to the median vertical line V and that passes through the point A,
- identifying on the image of the face the line MF that is the line perpendicular to the median vertical line V and that is equidistant from the line HA and the axis AGH,
- identifying on the image of the face the shape points (A, A2, MFD, MFG, ELPD, ELPG, BD, BG), including:
  - the point BG that is the intersection between the mouth line LB and the left edge of the face,
  - the point BD that is the intersection between the mouth line LB and the right edge of the face,
  - the point ELPG that is the intersection between cheek line LP and the left edge of the face,
  - the point ELPD that is the intersection between cheek line LP and the right edge of the face,
  - the point MFG that is the intersection between the line MF and the left hairline,
  - the point MFD that is the intersection between the line MF and the right hairline,
- identifying the characteristic shape of the face by interpretation of the positioning of the shape points (A, A2, MFD, MFG, ELPD, ELPG, BD, BG) on the image of the face:
  - if the shape points (A, A2, MFD, MFG, ELPD, ELPG, BD, BG) are substantially situated on an oval, with the height A-A2 approximately 33% greater than the width ELPD-ELPG, the face is called "oval",
  - if the shape points (A, A2, MFD, MFG, ELPD, ELPG, BD, BG) are substantially aligned on a circle, the face is called "round",
  - if the shape points (MFD, ELPD and BD) are substantially aligned vertically and the shape points (MFG, ELPG and BG) are substantially aligned vertically, with the height A-A2 approximately 33% greater than the width ELPD-ELPG, the face is called "rectangular",
  - if the shape points (MFD, ELPD and BD) are substantially aligned vertically and the shape points (MFG, ELPG and BG) are substantially aligned vertically, with the height A-A2 substantially equal to the width ELPD-ELPG, the face is called "square",
  - if the segments A-ELPD, ELPD-A2 or A-ELPG, ELPG-A2 form between them a salient angle, with the height A-A2 substantially equal to the width ELPD-ELPG, the face is called "diamond-shaped",
  - if the shape points (MFG, ELPG, BG) and (MFD, ELPD, BD) are substantially aligned on oblique axes crossing above the top of the head, with the length MFD-MFG approximately 33% less than the length ELPD-ELPG, the face is called "triangular with apex at top",
  - if the shape points (MFG, ELPG, BG) and (MFD, ELPD, BD) are substantially aligned on oblique axes crossing below the bottom of the face, with the length MFD-MFG approximately 33% greater than the length ELPD-ELPG, the face is called "triangular with apex at bottom".

Each of these points is easily identifiable on the image of a face, without this necessitating an in-depth knowledge of human anatomy.

The frame front may advantageously be contained in the receiving box (S'R'D'-S'R'G'-I'R'G'-I'R'D') and:
- for a round face a high end-piece TG1-TD1 is chosen,
- for a triangular face with the apex at the top a high end-piece TG1-TD1 is chosen,
- for a diamond-shaped face a high end-piece TG1-TD1 is chosen,
- for a square face an upper centered end-piece TG2-TD2 is chosen,
- for an oval face a centered end-piece TG3-TD3 is chosen,
- for a rectangular face a lower centered end-piece TG4-TD4 is chosen,
- for a triangular face with the apex at the bottom a low end-piece TG5-TD5 is chosen.

The choice of the position of the end-piece in the receiving box is always independent of an in-depth knowledge of human anatomy.

In a second aspect, the invention provides a device for preparing a spectacle frame, including:
- means for capturing and storing an image of a face,
- means for displaying the image of the face,
- interface or image recognition means for (manually or automatically) identifying and displaying on the image of the face characteristic points (A, A1, A2, OD, OG),
- shape comparison means for comparing the distribution in space of the shape points (A, A2, MFD, MFG, ELPD, ELPG, BD, BG) with predefined characteristic shapes,
- box calculation means for determining a spectacle frame receiving box,
- end-piece calculation means for determining the width and the position in terms of height of the end-pieces,
- said means being adapted to implement the method as defined above.

This device makes it possible to implement automatically the method in accordance with the first aspect of the invention.

BRIEF DESCRIPTION OF THE DRAWINGS

Other objects, features and advantages of the present invention will emerge from the following description of particular embodiments given with reference to the appended figures, in which.

DESCRIPTION OF PREFERRED EMBODIMENTS

Figure 1:
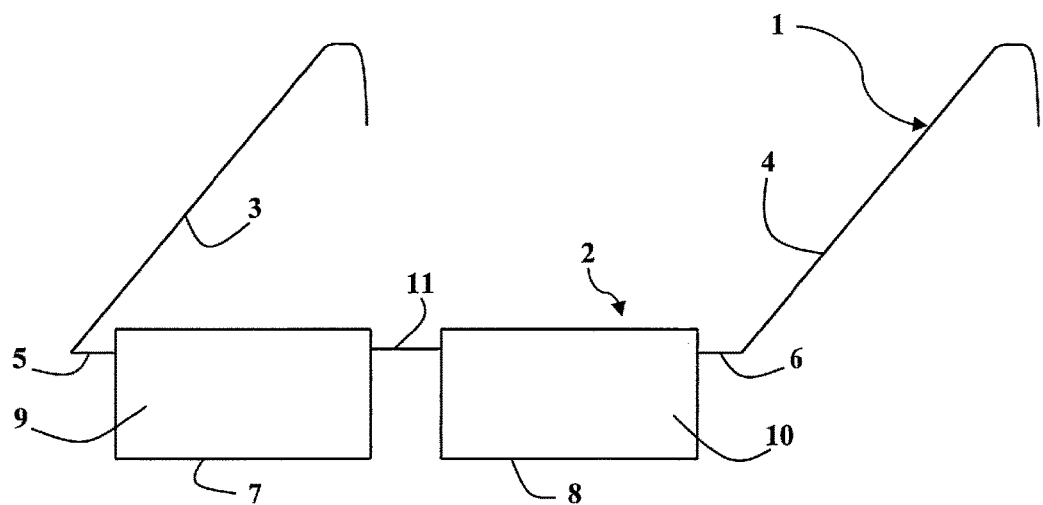
FIG. 1 is a diagrammatic perspective view of a spectacle frame in accordance with a first embodiment of the invention.

FIG. 1 shows a spectacle frame 1 comprising a frame front 2 and temples 3 and 4 connected to the frame front by end-pieces 5 and 6. The end-piece 5 connects the frame front 2 and the temple 3 and the end-piece 6 connects the frame front 2 and the temple 4. The frame front 2 includes two housings (rims) 7 and 8 adapted to receive respective optical lenses 9 and 10. The housings 7 and 8 are connected by a bridge 11. In this figure the housings 7 and 8 are of rectangular shape.

The housings 7 and 8 represent the structure in which the box diagram for the lens will be inscribed; the box diagram for the lens will have to bear on each of the sides of the structure.

The basic idea of the invention, for preparing a spectacle frame that correspond to a particular face shape, lies in the choice of the widths of the end-pieces 5 and 6, their position in terms of height, the size and the position of the lenses 9 and 10.

Figure 2:
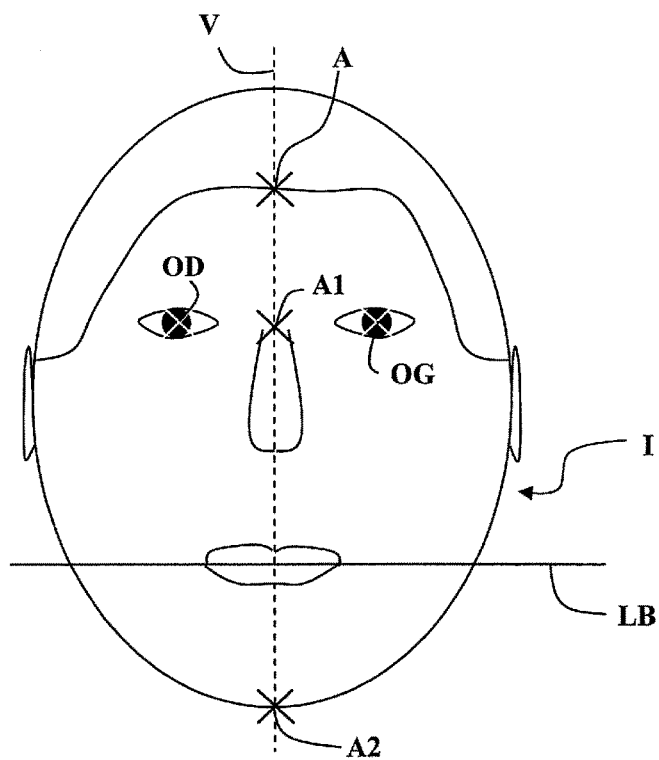
FIG. 2 shows a face with the characteristic points.

The first step of the method produces the image I of a face (for example to a scale of 1:1) with the forehead uncovered, including a chin, a forehead, a nose, two eyes and a mouth (FIG. 2). The image I must represent a face seen front on. It is advantageous for the client not to smile as the line LB will therefore be easier to identify. A second picture may be taken with the client smiling so as to render the cheek line LP more easily identifiable. The points PD and PG identified in this way on the second picture will be transferred onto the first picture (image I).

An image I of a face is advantageously captured by a device adapted to take digital photographs and connected to a computer or the like. This step is simple to implement and is independent of the anatomical knowledge of the optician.

The next step consists in identifying characteristic points (A, A1, A2, OD, OG), of which:
- the point A is situated at the hairline,
- the point A1 is situated at the center of the root of the nose,
- the point A2 is situated at the point of the chin,
- the point OD is the center of the right pupil,
- the point OG is the center of the left pupil.

It is then necessary to identify the median vertical line V that is the straight line nearest the points A, A1 and A2 (FIG. 2).

It is then necessary (see FIG. 3):
- to identify a right pupil axis APD that is parallel to the median vertical line V and that passes through the point OD,
- to identify a left pupil axis APG that is parallel to the median vertical line V and that passes through the point OG,
- to identify a right geometric axis AGD that is parallel to the median vertical line V and that is offset toward the right ear at a distance of half an interpupillary distance OD-OG increased by a distance d,
- to identify a left geometric axis AGG that is parallel to the median vertical line V and that is offset toward the left ear at a distance of half an interpupillary distance OD-OG increased by a distance d,
- to identify the point PD that is the intersection between the right pupil axis APD and the top of the right cheek,
- to identify the point PG that is the intersection between the left pupil axis APG and the top of the left cheek,
- to identify the point SD at the intersection between the arch of the right eyebrow and the right pupil axis APD,
- to identify the point SG at the intersection between the arch of the left eyebrow and the left pupil axis APG,
- to identify the line LS of the eyebrows, which is perpendicular to the median vertical line V and that passes at median distance of the points SD and SG,
- to identify the line LP of the cheeks, which is perpendicular to the median vertical line V and that passes at median distance of the points PD and PG,
- to identify the horizontal geometrical axis AGH of the frame, which is situated equidistantly from the eyebrow line LS and the cheek line LP, and which cuts the right geometrical axis AGD at the point QD and the left geometrical axis AGG at the point QG,
- to identify the point N'D that is the intersection between the horizontal geometrical axis AGH and the base of the right wing of the nose,
- to identify the point N'G that is the intersection between the horizontal geometrical axis AGH and the base of the left wing of the nose,
- to identify the point NO that is the intersection between the median vertical line V and the horizontal geometrical axis AGH,
- to identify the point ND that is on the horizontal geometrical axis AGH and that is half the distance N'D-N'G toward the right ear from the point NO,
- to identify the point NG that is on the horizontal geometrical axis AGH and that is half the distance N'D-N'G toward the left ear from the point NO,
- to identify the line PND parallel to the median vertical line V passing through the point ND,
- to identify the line PNG parallel to the median vertical line V passing through the point NG,
- to identify the point MTD that is the intersection between the horizontal geometrical axis AGH and the line SPND symmetrical to the axis PND relative to the right geometric axis AGD,
- to identify the point MTG that is the intersection between the horizontal geometrical axis AGH and the line SPNG symmetrical to the axis PNG relative to the left geometric axis AGG,
- to identify the point STD that is the intersection between the axis SPND and the eyebrow line LS,
- to identify the point SND that is the intersection between the axis PND and the eyebrow line LS,
- to identify the point STG that is the intersection between the axis SPNG and the eyebrow line LS,
- to identify the point SNG that is the intersection between the axis PNG and the eyebrow line LS,
- to identify the point ITD that is the intersection between the axis SPND and the cheek line LP,
- to identify the point IND that is the intersection between the axis PND and the cheek line LP, to identify the point ITG that is the intersection between the axis SPNG and the cheek line LP,
to identify the point ING that is the intersection between the axis PNG and the cheek line LP,
to identify the upper root ROD of the right ear,
to identify the upper root ROG of the left ear,
to identify the right end-piece line TD parallel to the median vertical line V and offset toward the right ear by a distance D,
to identify the point S'R'D' that is the intersection between the right end-piece line TD with the eyebrow line LS,
to identify the point I'R'D' that is the intersection between the right end-piece line TD and the cheek line LP,
to identify the left end-piece line TG parallel to the median vertical line V and offset toward the left ear by a distance D,
to identify the point S'R'G' that is the intersection between the left end-piece line TG and the eyebrow line LS,
to identify the point I'R'G' that is the intersection between the left end-piece line TG and the cheek line LP.

To facilitate the identification of the points PD and PG and thus the cheek line LP, the operator can ask the client to smile.

For a face image I on a scale of 1:1 a distance d of approximately 3.5 mm is chosen. For a face image I to a different scale a distance d in proportion to that scale is chosen.

The distance D depends on each face. It is preferably chosen as equal to half the distance ROD-ROG.

Figure 3:
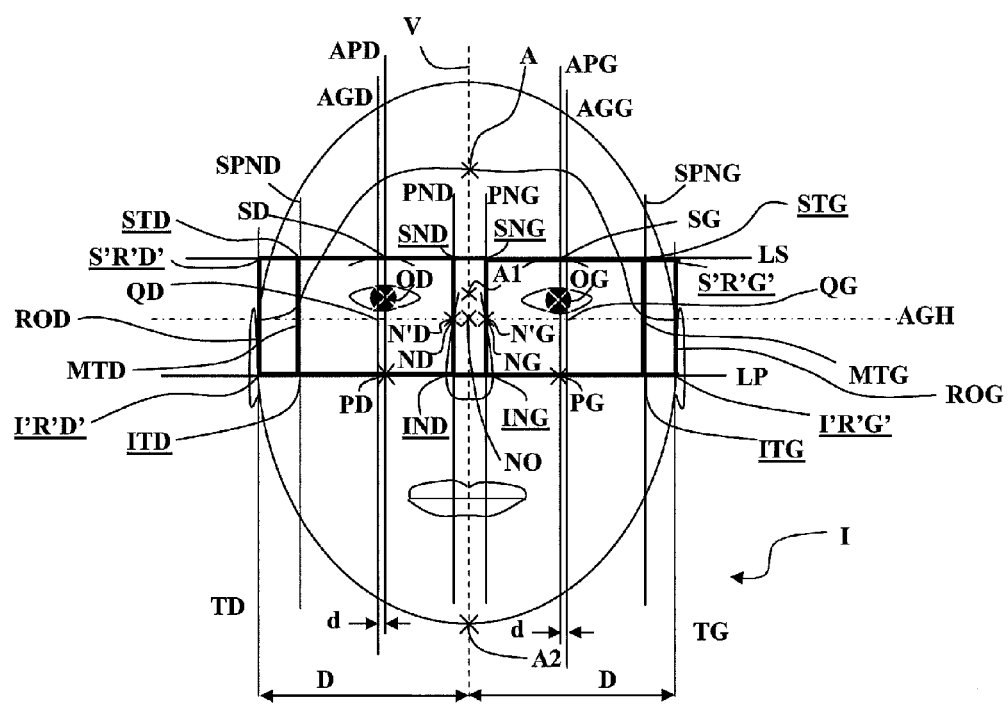
FIG. 3 shows the steps enabling determination of a receiving box for the spectacle frame by a method in accordance with a preferred embodiment of the invention.

For a better understanding, FIG. 3 shows the receiving box S'R'D' I'R'D' I'R'G'S'R'G' notably including five rectangles with thicker contours. The first rectangle is that defined by the points STD S'R'D' I'R'D' ITD. This rectangle corresponds to the rectangular box for the right end-piece. The second rectangle is that defined by the points STD SND IND ITD. This rectangle corresponds to the box for the right lens. The third rectangle is that defined by the points SND SNG ING IND. This rectangle corresponds to the nose box for the spectacle frame. The fourth rectangle is that defined by the points STG SNG ING ITG. This rectangle corresponds to the box for the left lens. The fifth rectangle is that defined by the points STG S'R'G' I'R'G' ITG. This rectangle corresponds to the rectangular box for the left end-piece.

The box for the right lens and the box for the left lens correspond to the maximum dimensions of the lenses. The size of the lenses could be adapted as a function of fashion and what the client wants provided that the lenses fit inside the boxes provided.

Figure 4:
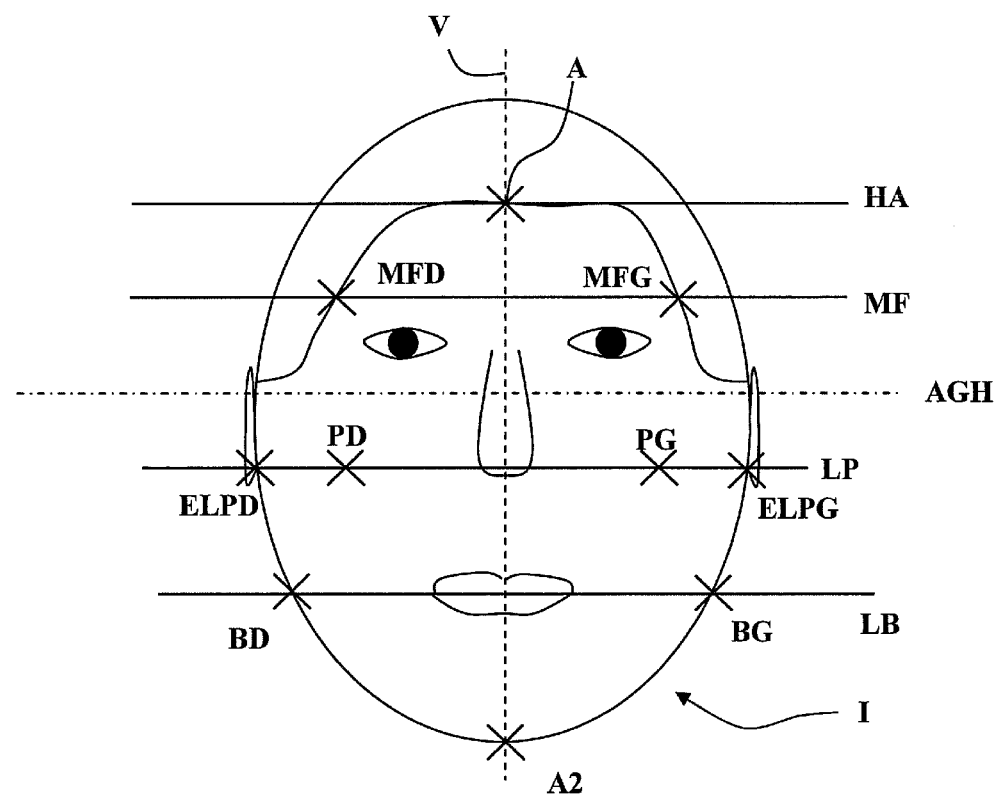
FIG. 4 shows a face provided with shape points in accordance with one embodiment of the invention.

The next step (FIG. 4) consists in identifying shape points (A, A2, MFD, MFG, ELPD, ELPG, BD, BG) on the face image I. For greater clarity, only the shape points are represented in FIG. 4.

To do this, the following steps are suggested:
identifying on the face image I the line LB of the mouth, which is the line perpendicular to the median vertical line V and that passes as closely as possible the two end points at the corners of the lips,
identifying on the face image I the line HA that is the horizontal line perpendicular to the median vertical line V and that passes through the point A,
identifying on the face image I the line MF that is the line perpendicular to the median vertical line V and that is equidistant from the line HA and the axis AGH,
on the face image I, identifying the shape points (A, A2, MFD, MFG, ELPD, ELPG, BD, BG), including:
the point BG that is the intersection between the mouth line LB and the left edge on the image of the face,
the point BD that is the intersection between the mouth line LB and the right edge of the image of the face,
the point ELPG that is the intersection between the cheek line LP and the left edge of the image of the face,
the point ELPD that is the intersection between the cheek line LP and the right edge of the image of the face,
the point MFG that is the intersection between the line MF and the left side hairline of the image of the face,
the point MFD that is the intersection between the line MF and the right side hairline of the image of the face.

The next step consists in identification of the characteristic shape of the face by interpretation of the distribution in space of the shape points (A, A2, MFD, MFG, ELPD, ELPG, BD, BG).

The distribution in space of these shape points identified on the face image I characterizes the shape of the face compared to predefined characteristic shapes.

Figure 5:
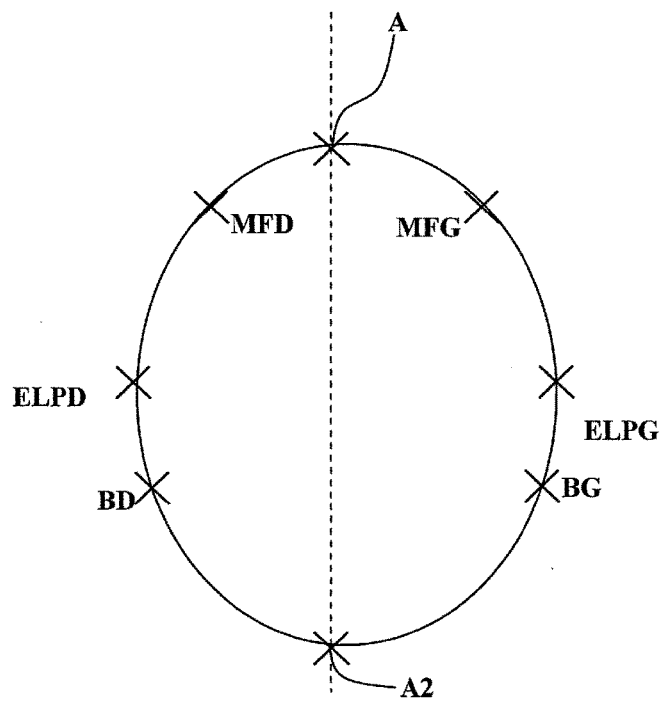
FIG. 5 is a diagrammatic view of the configuration of the shape points for an oval face.
Figure 6:
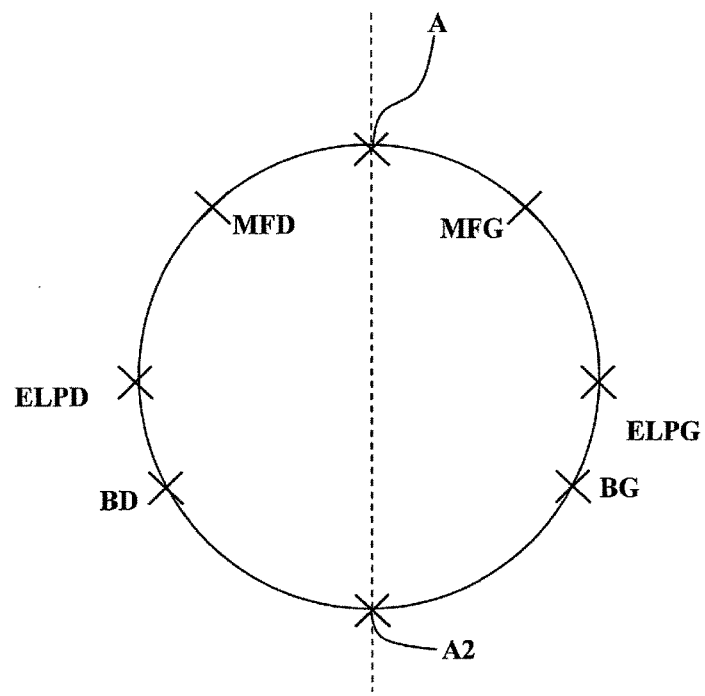
FIG. 6 is a diagrammatic view of the configuration of the shape points for a round face.
Figure 7:
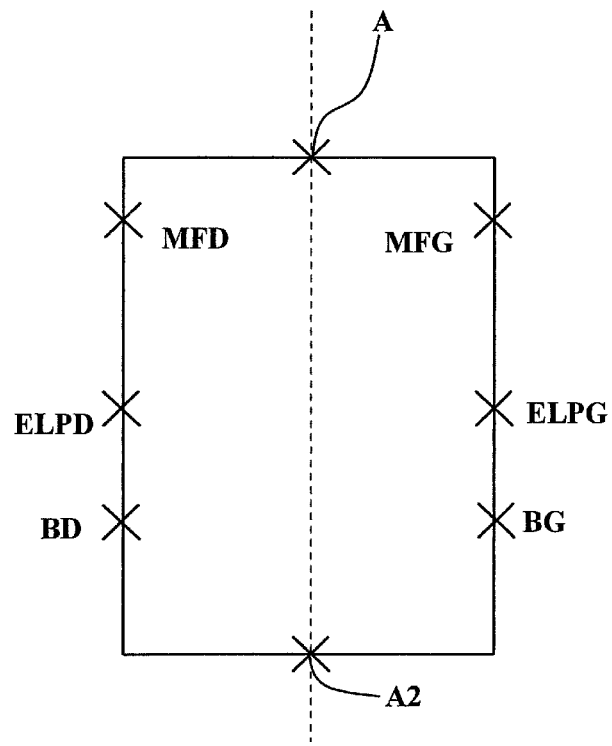
FIG. 7 is a diagrammatic view of the configuration of the shape points for a rectangular face.
Figure 8:
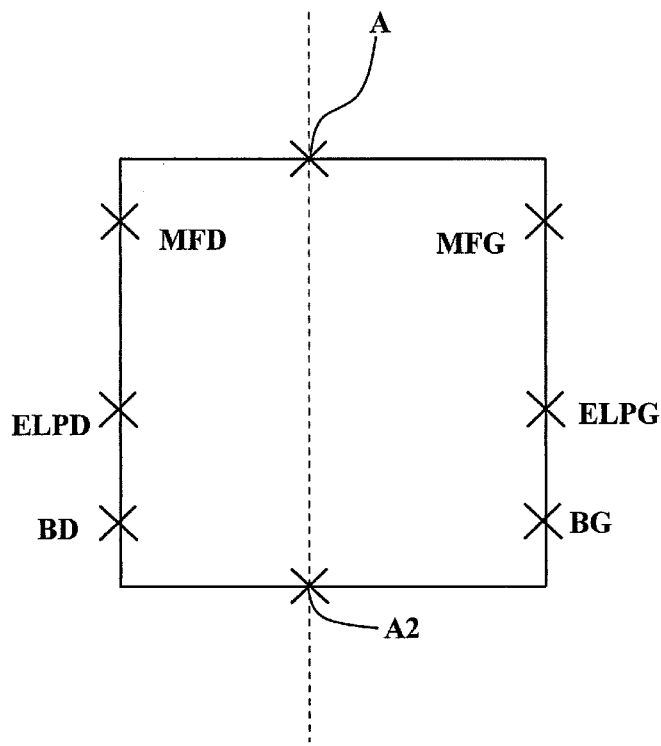
FIG. 8 is a diagrammatic view of the configuration of the shape points for a square face.
Figure 9:
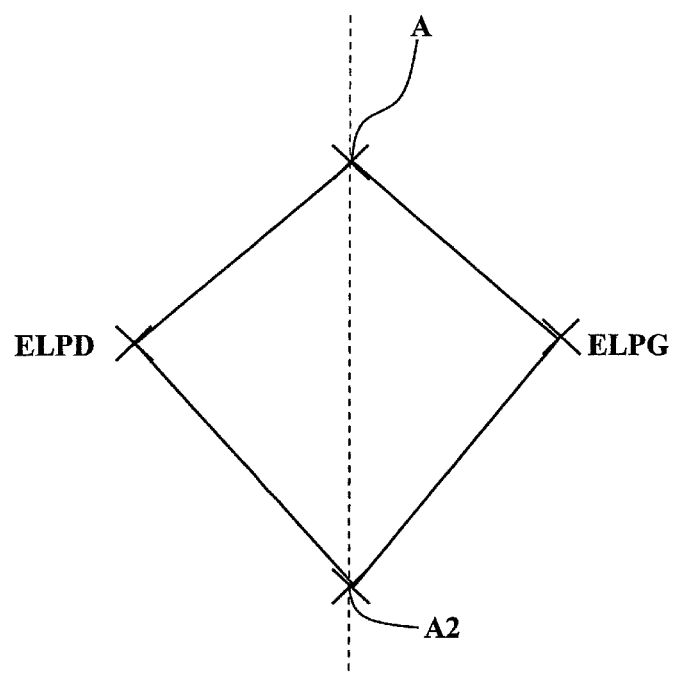
FIG. 9 is a diagrammatic view of the configuration of the shape points for a diamond-shaped face.
Figure 10:
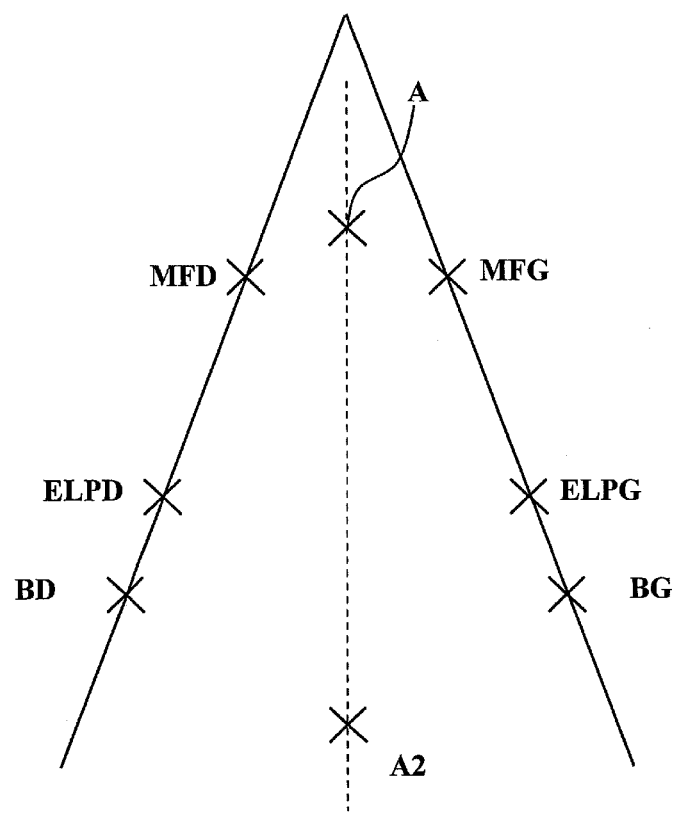
FIG. 10 is a diagrammatic view of the configuration of the shape points for a triangular face with the apex at the top.
Figure 11:
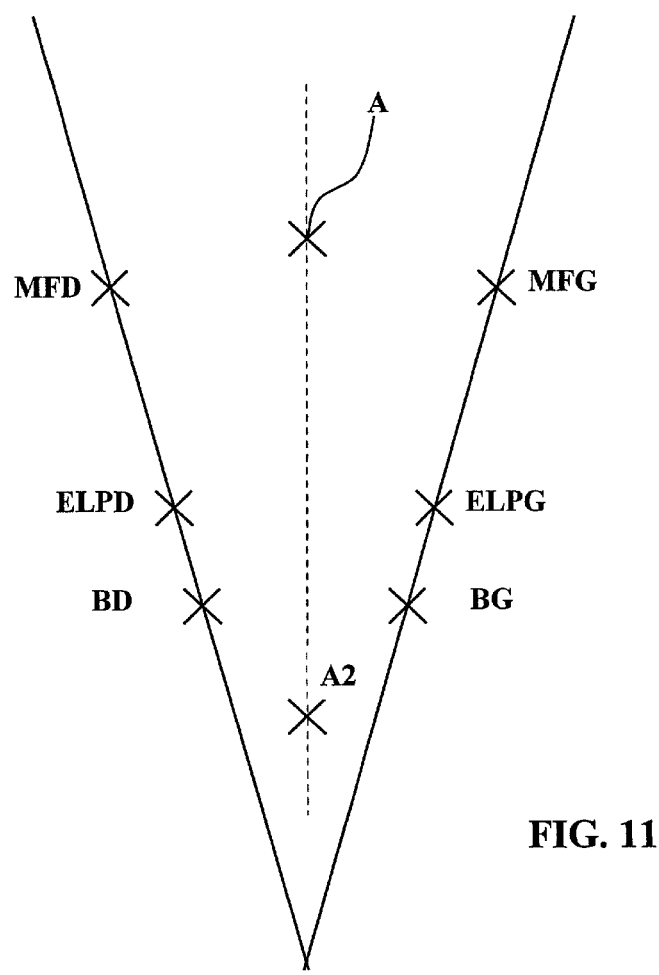
FIG. 11 is a diagrammatic view of the configuration of the shape points for a triangular face with the apex at the bottom.

Accordingly, the shape of the face is identified by the following interpretation of the positioning of the shape points A, A2, MFD, MFG, ELPD, ELPG, BD, BG:
if the shape points (A, A2, MFD, MFG, ELPD, ELPG, BD, BG) are substantially situated on an oval, with the height A-A2 approximately 33% greater than the width ELPD-ELPG, the face is called "oval" (FIG. 5),
if the shape points (A, A2, MFD, MFG, ELPD, ELPG, BD, BG) are substantially aligned on a circle, the face is called "round" (FIG. 6),
if the shape points (MFD, ELPD and BD) are substantially aligned vertically and the shape points (MFG, ELPG and BG) are substantially aligned vertically, with the height A-A2 approximately 33% greater than the width ELPD-ELPG, the face is called "rectangular" (FIG. 7),
if the shape points (MFD, ELPD and BD) are substantially aligned vertically and the shape points (MFG, ELPG and BG) are substantially aligned vertically, with the height A-A2 substantially equal to the width ELPD-ELPG, the face is called "square" (FIG. 8),
if the segments A-ELPD, ELPD-A2 or A-ELPG, ELPG-A2 form between them a salient angle, with the height A-A2 substantially equal to the width ELPD-ELPG, the face is called "diamond-shaped" (FIG. 9),
if the shape points (MFG, ELPG, BG) and (MFD, ELPD, BD) are substantially aligned on oblique axes crossing above the top of the head, with the length MFD-MFG approximately 33% less than the length ELPD-ELPG, the face is called "triangular with apex at top" (FIG. 10),
if the shape points (MFG, ELPG, BG) and (MFD, ELPD, BD) are substantially aligned on oblique axes crossing below the bottom of the face, with the length MFD-MFG approximately 33% greater than the length ELPD-ELPG, the face is called "triangular with apex at bottom" (FIG. 11).

The above interpretation may be effected by the optician or by an automated device.

FIGS. 5 to 11 show diagrammatically the various predefined face shapes.

Figure 12:
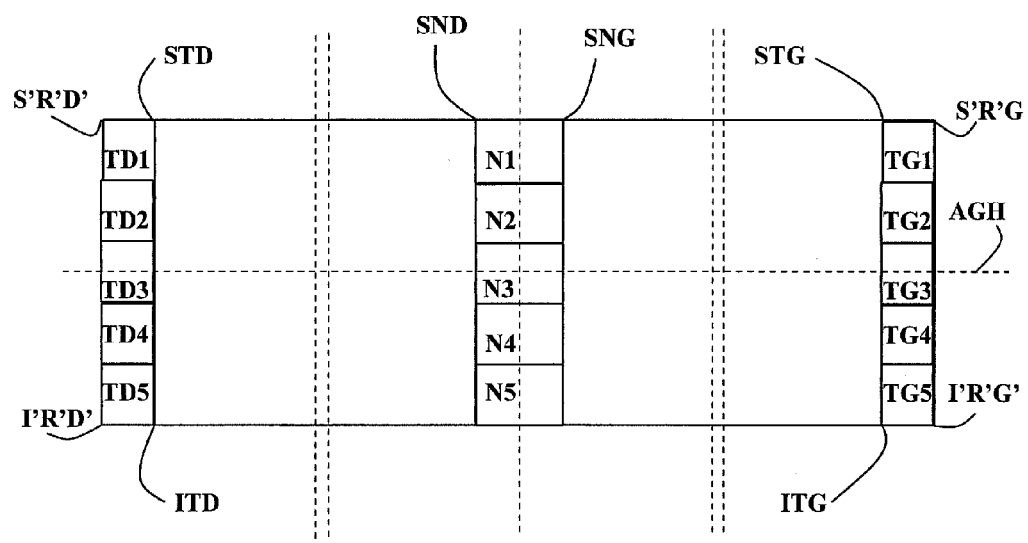
FIG. 12 is a diagrammatic view of the receiving box from FIG. 3.

It is thereafter a question of positioning the bridge. The bridge is the part of the frame that connects to each other the right optical lens and the left optical lens. Segmentation divides the rectangular nasal area into five equal rectangles N1, N2, N3, N4 and N5 (FIG. 12). N3 (FIG. 12) is centered on the horizontal geometrical axis AGH. The bridge must be able to rest on the edge of the nose.

It is then a question of determining the height of the end-pieces of the spectacle frame 1 as a function of the shape of the face (see FIG. 12).

The rectangular box STD, S'R'D', I'R'D', ITD for the right end-piece is segmented into five equal rectangles TD1, TD2, TD3, TD4, TD5. The right end-piece TD1 is the high right end-piece. The right end-piece TD2 is the upper centered right end-piece. The right end-piece TD3 is the right end-piece centered on the horizontal geometrical axis AGH. The right end-piece TD4 is the lower centered right end-piece. The right end-piece TD5 is the lower right end-piece.

The rectangular box STG, S'R'G', I'R'G', ITG for the left end-piece is segmented into five equal rectangles TG1, TG2, TG3, TG4, TG5. The left end-piece TG1 is the high left end-piece. The left end-piece TG2 is the upper centered left end-piece. The left end-piece TG3 is the left end-piece centered on the horizontal geometrical axis AGH. The left end-piece TG4 is the lower centered left end-piece. The left end-piece TG5 is the lower left end-piece.

The height of the end-pieces as a function of the shape of the face is determined in the following manner:
for a round face a high end-piece TD1-TG1 is chosen,
for a triangular face with the apex at the top a high end-piece TD1-TG1 is chosen,
for a diamond-shaped face a high end-piece TD1-TG1 is chosen,
for a square face an upper centered end-piece TD2-TG2 is chosen,
for an oval face a centered end-piece TD3-TG3 is chosen,
for a rectangular face a lower centered end-piece TD4-TG4 is chosen,
for a triangular face with the apex at the bottom a low end-piece TD5-TG5 is chosen.

Figure 13:
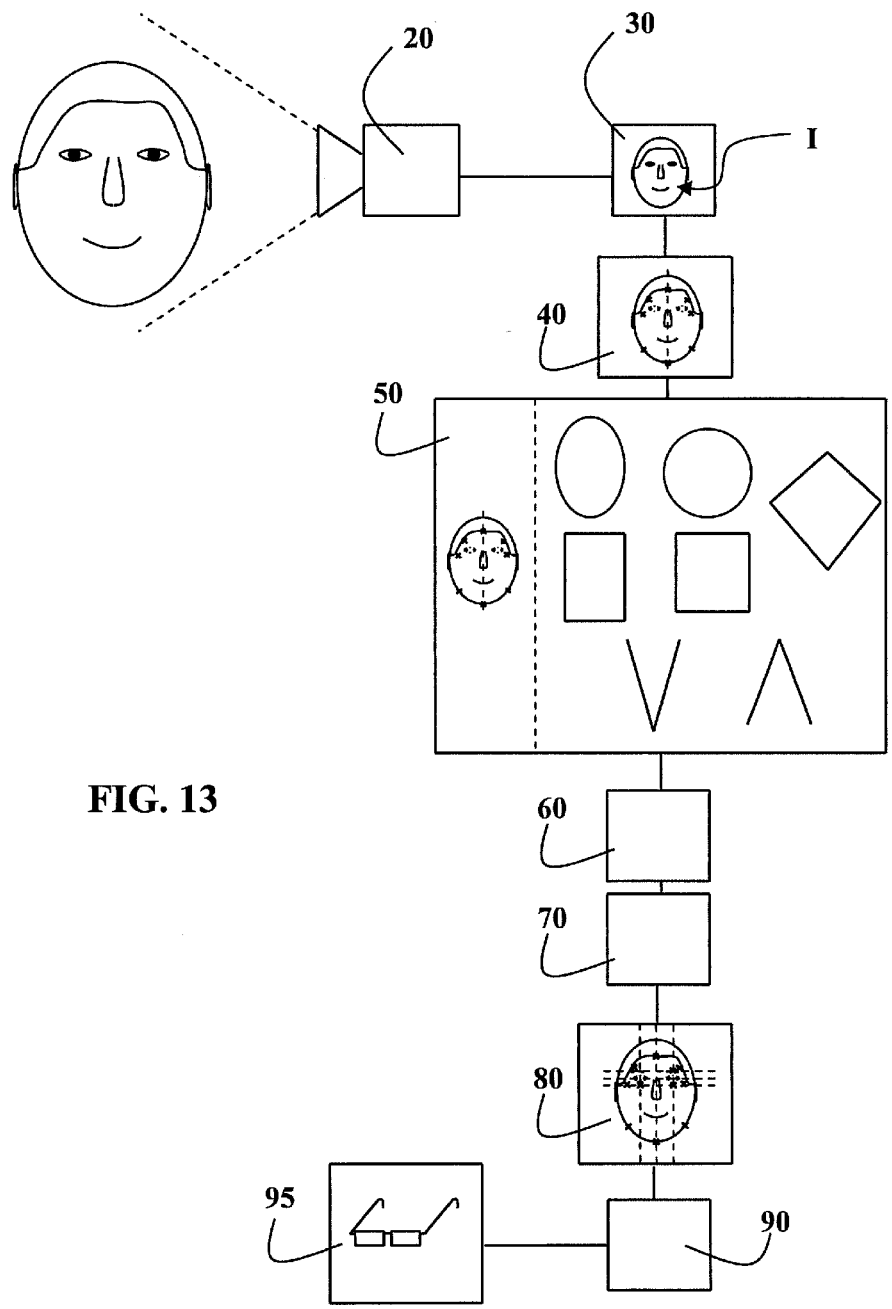
FIG. 13 is a diagrammatic view of a device in accordance with one embodiment of the invention for preparing a spectacle frame.

As shown diagrammatically in FIG. 13, the invention also provides a device for preparing a spectacle frame, including:
means 20 for capturing and storing an image I of a face,
means 30 for displaying the image I of the face,
interface or image recognition means 40 for (manually or automatically) identifying and displaying on the image I of the face characteristic points (A, A1, A2, OD, OG),
shape comparison means 50 for comparing the distribution in space of the shape points (A, A2, MFD, MFG, ELPD, ELPG, BD, BG) with predefined characteristic shapes,
box calculation means for determining a spectacle frame receiving box,
end-piece calculation means for determining the width and the position in terms of height of the end-pieces, said means being adapted to implement the method according to the invention.

Such a device enables automation of the method in accordance with the invention, which makes it possible to circumvent the knowledge of the operator.

The capture and storage means 20 may advantageously be a still camera or a video camera, optionally with onboard memory.

The still camera may advantageously be connected (by any type of cable or other connection) to a computer including a central processor unit, memories and a screen. Thus the screen constitutes the means 30 for displaying the image I of the face V.

For the identification of the characteristic points (A, A1, A2, OD, OG) or the shape points (A, A2, MFD, MFG, ELPD, ELPG, BD, BG), it is possible to use either an interface 40 or 70 actuated by the operator (by clicking a mouse on the displayed image I of the face) or automatic means for recognizing parts of the face on the displayed image I.

The shape comparison means 50 may comprise either an interface enabling the operator to enter a choice of the shape recognized on the image I (keyboard or mouse click) or an automatic program for comparison of geometrical figures.

The various calculation and display means 30, 60, 80, 90 and 95 may advantageously comprise an appropriate computer program stored in the memories of the computer.

The present invention is not limited to the embodiments that have been described explicitly and includes diverse variants and generalizations thereof that fall within the scope of the following claims.

The invention claimed is:

1. A method for preparing a spectacle frame (1) adapted to a face, the spectacle frame (1) having a bridge (11) between two lenses (9-10) and a frame front (2) with end-pieces (5-6) to which temples (3-4) are connected, the method including the following steps:
procuring an image (I) of the face, forehead uncovered,
identifying characteristic points (A, A1, A2, OD, OG) on the image (I) of the face,
identifying shape points (A, A2, MFD, MFG, ELPD, ELPG, BD, BG) on the image (I) of the face,
identifying by these shape points (A, A2, MFD, MFG, ELPD, ELPG, BD, BG) the shape of the face among predefined characteristic shapes,
determining from these characteristic points a receiving box (S'R'D', S'R'G', I'R'G', I'R'D') for the frame front of the spectacle frame, and
determining the width and the position in terms of height of the end-pieces relative to the face of the spectacle frame as a function of the identified shape of the face,
wherein the characteristic points (A, A1, A2, OD, OG) comprise:
the point A that is situated at the front hairline,
the point A1 that is situated at the center of the root of the nose,
the point A2 that is situated at the point of the chin,
the point OD that is the center of the right pupil,
the point OG that is the center of the left pupil,
further including the step of identifying the median vertical line (V) that is the straight line nearest the points A, A1 and A2,
further including the following steps:
identifying a right pupil axis APD that is parallel to the median vertical line (V) and that passes through the point OD,
identifying a left pupil axis APG that is parallel to the median vertical line (V) and that passes through the point OG,
identifying a right geometric axis AGD that is parallel to the median vertical line (V) and that is offset toward the right ear at a distance of half an interpupillary distance OD-OG increased by a distance (d), said distance (d) being approximately 3.5 mm for an image on a 1:1 scale,
identifying a left geometric axis AGG that is parallel to the median vertical line (V) and that is offset toward the left ear at a distance of half an interpupillary distance OD-OG increased by a distance (d), said distance (d) being approximately 3.5 mm for an image on a 1:1 scale,
identifying the point PD that is the intersection between the right pupil axis APD and the top of the right cheek, identifying the point PG that is the intersection between the left pupil axis APG and the top of the left cheek, identifying the point SD at the intersection between the lower boundary of the right eyebrow and the right pupil axis APD, identifying the point SG at the intersection between the lower boundary of the left eyebrow and the left pupil axis APG, identifying the line LS of the eyebrows, which is perpendicular to the median vertical line (V) and that passes at median distance of the points SD and SG, identifying the line LP of the cheeks, which is perpendicular to the median vertical line (V) and that passes at median distance of the points PD and PG, identifying the horizontal geometrical axis AGH of the frame, which is situated equidistantly from the eyebrow line LS and the cheek line LP, and which cuts the right geometrical axis AGD at the point QD and the left geometrical axis AGG at the point QG, identifying the point N'D that is the intersection between the horizontal geometrical axis AGH and the base of the right wing of the nose, identifying the point N'G that is the intersection between the horizontal geometrical axis AGH and the base of the left wing of the nose, identifying the point NO that is the intersection between the median vertical line (V) and the horizontal geometrical axis AGH, identifying the point ND that is on the horizontal geometrical axis AGH and that is half the distance N'D-N'G toward the right ear from the point NO, identifying the point NG that is on the horizontal geometrical axis AGH and that is half the distance N'D-N'G toward the left ear from the point NO, identifying the line PND parallel to the median vertical line (V) passing through the point ND, identifying the line PNG parallel to the median vertical line (V) passing through the point NG, identifying the point MTD that is the intersection between the horizontal geometrical axis AGH and the line SPND symmetrical to the axis PND relative to the right geometric axis AGD, identifying the point MTG that is the intersection between the horizontal geometrical axis AGH and the line SPNG symmetrical to the axis PNG relative to the left geometric axis AGG, identifying the point STD that is the intersection between the axis SPND and the eyebrow line LS, identifying the point SND that is the intersection between the axis PND and the eyebrow line LS, identifying the point STG that is the intersection between the axis SPNG and the eyebrow line LS, identifying the point SNG that is the intersection between the axis PNG and the eyebrow line LS, identifying the point ITD that is the intersection between the axis SPND and the cheek line LP, identifying the point IND that is the intersection between the axis PND and the cheek line LP, identifying the point ITG that is the intersection between the axis SPNG and the cheek line LP, identifying the point ING that is the intersection between the axis PNG and the cheek line LP, identifying the upper root ROD of the right ear, identifying the upper root ROG of the left ear, identifying the right end-piece line TD parallel to the median vertical line (V) and offset toward the right ear by a distance (D), said distance (D) being half the distance ROD-ROG, identifying the point S'R'D' that is the intersection between the right end-piece line TD and the eyebrow line LS, identifying the point I'R'D' that is the intersection between the right end-piece line TD and the cheek line LP, identifying the left end-piece line TG parallel to the median vertical line (V) and offset toward the left ear by a distance (D), said distance (D) being half the distance ROD-ROG, identifying the point S'R'G' that is the intersection between the left end-piece line TG and the eyebrow line LS, identifying the point I'R'G' that is the intersection between the left end-piece line TG and the cheek line LP.

2. The method as claimed in claim 1, wherein the median vertical line (V) is determined by the method of least squares.

3. The method as claimed in claim 1, wherein the receiving box includes:
a right lens box, determined by the points STD SND IND ITD,
a left lens box, determined by the points STG SNG ING ITG,
a nose box, determined by the points SND SNG ING IND,
a rectangular box for the left end-piece, determined by the points STG, S'R'G', I'R'G', ITG,
a rectangular box for the right end-piece, determined by the points STD, S'R'D', I'R'D', ITD.

4. The method as claimed in claim 1, including the following steps for determining the shape of the face:
identifying on the image (I) of the face the line LB of the mouth, which is the line perpendicular to the median vertical line (V) and that passes as closely as possible the two end points at the corners of the lips,
identifying on the image (I) of the face the line HA that is the horizontal line perpendicular to the median vertical line (V) and that passes through the point A,
identifying on the image (I) of the face the line MF that is the line perpendicular to the median vertical line (V) and that is equidistant from the line HA and the axis AGH,
identifying on the image (I) of the face the shape points (A, A2, MFD, MFG, ELPD, ELPG, BD, BG), including:
the point BG that is the intersection between the mouth line LB and the left edge of the face,
the point BD that is the intersection between the mouth line LB and the right edge of the face,
the point ELPG that is the intersection between the cheek line LP and the left edge of the face,
the point ELPD that is the intersection between the cheek line LP and the right edge of the face,
the point MFG that is the intersection between the line MF and the left hairline,
the point MFD that is the intersection between the line MF and the right hairline,
identifying the characteristic shape of the face by interpretation of the positioning of the shape points (A, A2, MFD, MFG, ELPD, ELPG, BD, BG) on the image of the face:
if the shape points (A, A2, MFD, MFG, ELPD, ELPG, BD, BG) are substantially situated on an oval, with the height A-A2 approximately 33% greater than the width ELPD-ELPG, the face is called "oval", if the shape points (A, A2, MFD, MFG, ELPD, ELPG, BD, BG) are substantially aligned on a circle, the face is called "round", if the shape points (MFD, ELPD and BD) are substantially aligned vertically and the shape points (MFG, ELPG and BG) are substantially aligned vertically, with the height A-A2 approximately 33% greater than the width ELPD-ELPG, the face is called "rectangular", if the shape points (MFD, ELPD and BD) are substantially aligned vertically and the shape points (MFG, ELPG and BG) are substantially aligned vertically, with the height A-A2 substantially equal to the width ELPD-ELPG, the face is called "square", if the segments A-ELPD, ELPD-A2 or A-ELPG, ELPG-A2 form between them a salient angle, with the height A-A2 substantially equal to the width ELPD-ELPG, the face is called "diamond-shaped", if the shape points (MFG, ELPG, BG) and (MFD, ELPD, BD) are substantially aligned on oblique axes crossing above the top of the head, with the length MFD-MFG approximately 33% less than the length ELPD-ELPG, the face is called "triangular with apex at top", if the shape points (MFG, ELPG, BG) and (MFD, ELPD, BD) are substantially aligned on oblique axes crossing below the bottom of the face, with the length MFD-MFG approximately 33% greater than the length ELPD-ELPG, the face is called "triangular with apex at bottom".

5. The method as claimed in claim 1, wherein the frame front is contained in the receiving box (S'R'D'-S'R'G'-I'R'G'-I'R'D'), and in that:

for a round face a high end-piece TG1-TD1 is chosen, for a triangular face with the apex at the top a high end-piece TG1-TD1 is chosen, for a diamond-shaped face a high end-piece TG1-TD1 is chosen, for a square face an upper centered end-piece TG2-TD2 is chosen, for an oval face a centered end-piece TG3-TD3 is chosen, for a rectangular face a lower centered end-piece TG4-TD4 is chosen, for a triangular face with the apex at the bottom a low end-piece TG5-TD5 is chosen.

6. A device for preparing a spectacle frame, including:

means (20) for capturing and storing an image (I) of a face, means (30) for displaying the image (I) of the face, interface or image recognition means (40) for (manually or automatically) identifying and displaying on the image (I) of the face characteristic points (A, A1, A2, OD, OG), shape comparison means (50) for comparing the distribution in space of the shape points (A, A2, MFD, MFG, ELPD, ELPG, BD, BG) with predefined characteristic shapes, box calculation means for determining a spectacle frame receiving box, end-piece calculation means for determining the width and the position in terms of height of the end-pieces, said means being adapted to implement the method according to claim 1.

* * * * *